United States Patent [19]

Schnetz

[11] Patent Number: 5,102,109

[45] Date of Patent: Apr. 7, 1992

[54] HYDRAULIC SHOCK ABSORBER

[75] Inventor: Rainer Schnetz, Munich, Fed. Rep. of Germany

[73] Assignee: Festo KG, Ruiter Strasse, Fed. Rep. of Germany

[21] Appl. No.: 475,130

[22] Filed: Feb. 2, 1990

[30] Foreign Application Priority Data

Mar. 8, 1989 [DE] Fed. Rep. of Germany ....... 3907355

[51] Int. Cl.⁵ .............................................. F16F 9/342
[52] U.S. Cl. ................................... 267/226; 188/282; 188/289; 188/314; 267/64.22
[58] Field of Search ............... 188/280, 282, 288, 289, 188/317, 322.15, 284, 286, 287, 314; 267/64.18, 64.22, 226

[56] References Cited

U.S. PATENT DOCUMENTS

| 2,089,656 | 8/1937 | Magrum | 188/282 |
| 2,559,633 | 7/1951 | Katz | 188/289 |
| 2,867,298 | 1/1959 | Roder | 188/282 |
| 3,833,248 | 9/1974 | Wossner et al. | 188/282 X |
| 4,068,845 | 1/1978 | Schmid | 188/289 X |
| 4,273,220 | 6/1981 | Tilkens | 188/282 |
| 4,337,849 | 7/1982 | Siorek et al. | 188/287 X |

FOREIGN PATENT DOCUMENTS 154419 9/1938 Austria .............................. 188/287

Primary Examiner—George E. A. Halvosa
Attorney, Agent, or Firm—Flynn, Thiel, Boutell & Tanis

[57] ABSTRACT

A hydraulic shock absorber with a housing defining a high pressure space and containing a piston adapted to be moved by a mass to be damped. When the piston is moved for damping hydraulic fluid is displaced from the high pressure space so that there is a damping action. There is both a pressure-dependent damping device and also a piston stroke-dependent damping device.

7 Claims, 1 Drawing Sheet

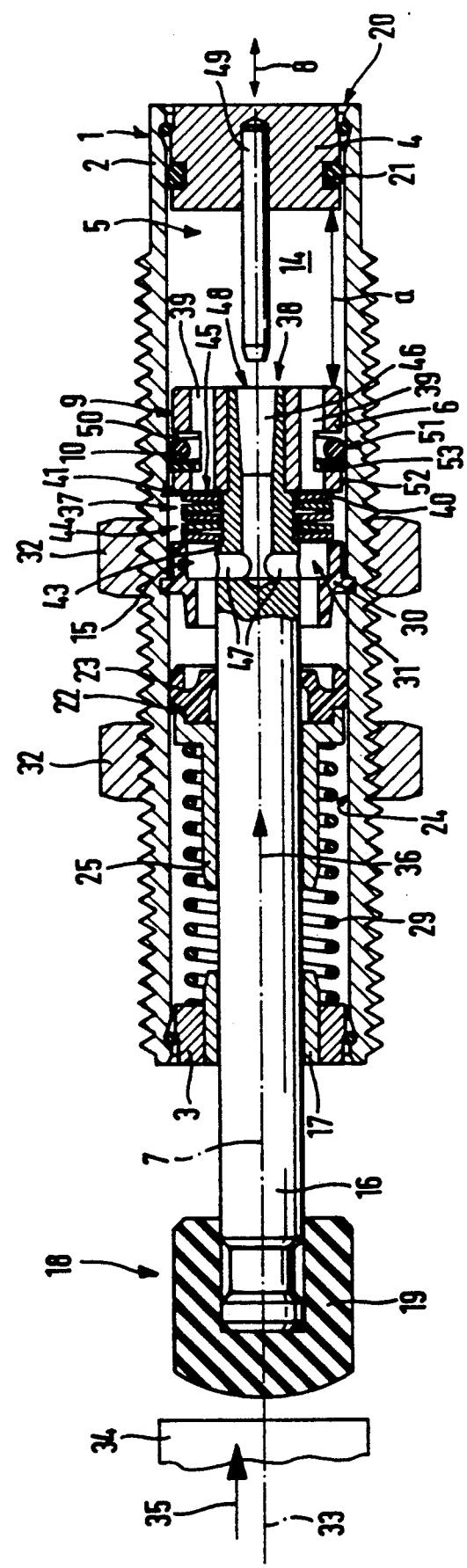

HYDRAULIC SHOCK ABSORBER

FIELD OF THE INVENTION

The invention relates to a hydraulic shock absorber comprising a more especially cylindrical housing defining a high pressure space, hydraulic fluid located in said high pressure space, a piston adapted to act on said space, said piston being adapted to be displaced in said housing with the transfer of momentum to be damped and to displace hydraulic fluid out of the high pressure space during the course of damping motion of the piston, and a damping device adapted to regulate the displacement flow of said fluid in a manner dependent on the pressure in the high pressure space.

BACKGROUND OF THE INVENTION

Such a shock absorber has been described in the German specification (DE-OS) 3,302,790 (corresponding to U.S. Pat. No. 4,564,176), for instance. It serves to damp the shock or impact of a mass moving along a path of travel, as for instance in conjunction with terminal position damping in pneumatic or hydraulic drives. The shock energy is generally transferred to the piston by way of a shock rod connected with the piston and which extends out of the housing for connection with a member on which the shock acts. Although this type of shock absorber is highly satisfactory for applications in which the piston is subject to high-speed and/or high energy, there is hardly any damping action if the impact speed of the mass to be damped is less, as for instance under 0.3 m per second, that is to say the damping device of the this known shock absorber often fails to react so that there is hardly any damping action. Although the response threshold of such a known shock absorber may be reduced, there is then less satisfactory operation at high impact speeds. At any event, although known shock absorbers are able to cope with certain problems to a sufficient extent, applications in which there are continual changes in the speed and/or mass or, respectively, weight in connection with the load to be damped are not able to be adequately dealt with for the reasons stated above.

SHORT SUMMARY OF THE INVENTION

Accordingly one object of the present invention is to provide a shock absorber of the initially mentioned type which provides optimum damping performance independently of the type and intensity of the motion to be damped.

A further aim of the invention is to devise such a shock absorber which is suitable both for the damping of small masses moving at a high speed and also for the damping of large masses moving at a low speed.

A still further object of the invention is to provide such a shock absorber which is able to operate in connection with different types of loads without resetting.

In order to achieve these or other aims appearing from the present specification, claims and drawing, in order to regulate the displacement flow there is a second damping device which operates in a piston travel-dependent manner in addition to the first damping device which operates in a pressure-dependent manner. These two damping devices are preferably connected functionally in parallelism so that they are preferably able to regulate a separate fraction of the displacement flow independently from each other. It is in this manner that a single shock absorber may be used for different load situations without resetting its damping action. Preferably, the piston travel-dependent second damping device serves for the damping of shocks, which involve a low impact speed, and which may for instance take place with a speed of under 0.3 m per second. If on the other hand it is question of shocks with a larger impact speed, as for instance a speed amounting to 4 m per second, the shock absorbing action is preferably produced by the first damping device, which acts in a pressure-dependent manner. During the course of the damping action the effect of the two damping devices may overlap. It is thus possible for instance for high-intensity and high-speed shocks to firstly be damped only by the taking effect of the pressure-dependent damping device, and after a certain proportion of the input shock energy has been damped, the second, damping device takes effect as an alternative or in addition. The shock absorber in accordance with the invention is of universal application and is characterized by a simple, low-price structure and it needs little servicing.

Advantageous developments of the invention are described in the claims.

The pressure-dependent first damping device is best designed so that it has a relief valve arranged in a flow path of the displacement flow so that when a critical pressure level becomes established in the high pressure space owing to the piston motion and the resulting pressurization the valve opens and makes available a flow path to a low pressure space. In this respect the arrangement may be such that the closing force of the relief valve is able to be reset and modified in order to have an effect on the critical pressure value which has to be attained for the valve to open and in order to produce a basic setting adapted to suit the loads which are likely. Preferably, there is a spring arrangement for providing the closing force for operation of the relief valve. In order to ensure that the shock absorber has a short overall length and is compact, it is more especially possible to mount the relief valve so as to move with the piston and more especially to integrate the valve with the piston.

The travel-dependent damping device preferably has an outlet port opening into the high pressure space and communicating with a low pressure space so that hydraulic fluid may be forced through this port by the displacing action of the piston motion reducing the size of the volume of the high pressure space out of the high pressure space into the low pressure space. It is thus possible for the high pressure space to be continuously connected with the low pressure space, this ensuring rapid response of the second damping device even in the case of a low shock energy. The intensity of the damping effect is in this case substantially dictated by the cross section of the outlet port which is available. It is an advantage in this respect if this outlet cross section is able to be altered so that a basic setting may be produced taking into account the likely loads.

It is furthermore an advantage if the effective cross section of the outlet port is varied in a way dependent on the damping stroke traveled by the piston, such variation being more especially in accordance with a desired damping characteristic. It is possible for instance to ensure that the intensity of the damping action increases pari passu as the piston moves in order to be able to ensure a continuous retardation of a moving mass. Preferably the outlet port is fixed in relation to the setting piston or in relation to the housing, while the respectively other element takes the form of a damping element which plunges into the outlet port when the piston moves so as to change the outlet cross section and more particularly to reduce the cross section. Suitable design features of the outlet port and of the damping element may be used to ensure damping functions which are for instance linear, progressive, or the like.

It is furthermore an advantage to have a damping space within the interior of the shock absorber, which is divided by the moving piston into a high pressure space filled with hydraulic fluid and a low pressure space, a load or shock-transmitting rod being arranged on the piston so as to extend outwards in the direction of displacement, and move in such direction, through the housing, the displacement flow being passed through the piston and/or the piston rod on transfer from the high pressure space to the low pressure space. This as well serves to ensure a compact outer form of the shock absorber.

In order to ensure a rapid return motion into the initial position assumed prior to performing a damping stroke, it is an advantage if a return duct having a check valve thereon opens into the high pressure space, such duct best being preferably connected with the low pressure space and serving to conduct hydraulic fluid, which is displaced when the piston is moved in a direction opposite to the damping motion, into the high pressure space. The return flow duct is also preferably arranged in the piston.

In order to allow for loses of the hydraulic fluid and/or temperature-dependent variations in density of the hydraulic fluid, it is convenient to have a moving compensatory piston, which more especially pressurizes hydraulic fluid in the low pressure space. The compensatory piston is preferably also used as a returning means in order to move the piston back into its initial position.

An account will now be given of one first possible embodiment of the shock absorber in accordance with the invention with reference to the drawing, which shows the shock absorber in longitudinal section.

DETAILED DESCRIPTION OF THE INVENTION.

The illustrated shock absorber possesses a housing 1, which is designed in the form of a cylinder. More especially the housing may be in the form of a straight cylindrical tube 2, which is shut off in a sealing manner at one end by an end cover 3 and at the other end by a bottom part 4. In the interior of the housing there is a damping space 5, in which a piston 6 is able to reciprocate in the longitudinal direction 7 of the cylinder as indicated by the double arrow 8. On its outer periphery 9 the piston has a sealing element 10, as for example in the form of a sealing ring, extending around it, which provides a sealing action between the setting piston 6 and the housing 1.

The piston 6 divides up the damping space 5 in a sealing manner into a high pressure space 14 adjacent to the bottom and a low pressure space 15 adjacent to the end cover 3. A load or shock rod 16 extends through the low pressure space 15 coaxially to the piston 6 with to which it is fixedly joined. The rod extends through the cover 3 to the outside.

In the part of the cover 3 through which the rod extends there is preferably a guide means 17, as for example one in the form of a guide sleeve, in order to support and guide the shock rod 16 when it is moved in translation. The outer end of the shock rod 16 is provided with a shock take-up member 18, which, as illustrated, may be in the form of a rubber buffer 19, although this is only one instance of a possible design of take-up member.

At its axial end remote from the piston 6, the high pressure space 14 is delimited by the bottom part 4, which is best inserted in a sealing manner in the damping space 5 from the one end 20 of the housing 1. In order to provide a sealing effect between the bottom part 4 and the housing 1 there is a sealing ring 21 let into a peripheral groove in the bottom part 4.

On the axial end opposite to the piston the low pressure space 15 adjacent to the piston or shock rod is separated by compensatory piston 22 which is able to reciprocate axially in the damping space 5 by as indicated by the double arrow 8. The compensatory piston surrounds the shock rod 16 coaxially with a running fit and is provided with a suitable, coaxially arranged sealing part 23, which makes sealing, sliding contact radially on the outside with inner bore surface 24 of the damping space 5 and radially inwards on the outer face of the shock rod 16.

There is a sleeve part 25 surrounding the shock rod 16 for guiding the compensatory piston 22 without any danger of its running skew on the shock rod 16.

The compensatory piston 22 is furthermore resiliently biased in towards the piston 6, such biasing effect preferably being provided by a spring arrangement 29, which is located between the cover 3 and the compensatory piston 22.

In the initial position illustrated in the drawing the piston 6 is arranged so as to be at distance a from the bottom part 4 corresponding to the maximum damping stroke, the high pressure space 14 having its maximum volume. In this initial position the piston 6 bears against an abutment 30 arranged in the low pressure space 15. This abutment is preferably in the form of an abutment ring, which is secured on the inner periphery 24 of the damping space 5 so as to be fixed in relation to the housing and it is of such a size as to leave a duct 31, more especially of annular cross section between it and the shock rod 16. The abutment 30 is conveniently made of a plastic material.

The section of the damping space 5 delimited by the bottom part 4 and the compensatory piston 22 is completely filled with a hydraulic fluid as for instance hydraulic system oil. This hydraulic fluid is thus located both in the high pressure space 14 and also in the low pressure space 15 as well in the connecting ducts, to be explained later, between these two spaces.

For operation the shock absorber has its housing 1 secured to a machine frame for instance using fastening means 32 and is so aligned that its shock take-up means 18 extends into the path 33 of motion of a mass 34 whose motion is to be damped. In this respect it is an advantage if the path 33 of motion is parallel to the shock rod 16 and in particular is aligned with the longitudinal axis thereof. The mass 34 able to move along a path may be in the form of any desired body or structure, as for example in the form of part of a machine which is to be retarded prior to reaching its terminal position.

When as indicated by the arrow 35 the moving mass 34 strikes the shock take-up member 18, the piston 6 will perform a damping movement towards the bottom part 4, it then coming clear of the abutment 30. As a result the high pressure space 14, that is to say the hydraulic fluid contained therein, will be acted upon and put under a high pressure. As a result this hydraulic fluid will be displaced out of the high pressure space 14 and will transfer into the low pressure space 15. The effect is then that kinetic energy will be absorbed and in consequence of this the piston 6 and the mass 34 to be damped, will perform a damped movement and come to rest at least temporarily.

In accordance with the invention there are two damping devices 37 and 38, with which the displacement flow from the high pressure space 14 into the low pressure space 15 may be regulated. In this respect it is a question of a first damping device 37 operating in a pressure-dependent manner, and a second damping device 38 operating in accordance with distance traveled, that is to say in accordance with the effect of the travel of the piston moving along its damping stroke 36.

The two damping devices 37 and 38 are connected in parallelism so that, dependent on the operational condition, they may take effect alternatingly or simultaneously. The two damping devices 37 and 38 are thus in a position to regulate a separate part of the displacement flow from the high pressure space 14.

The pressure-dependent first damping device 37 comprises a relief valve 41, which is placed on one possible flow path of the displacement flow. It is in the form of a normally closed valve so that the flow path through it is shut off when the valve is not operated.

In the present example of the invention this flow path is constituted by a number of transfer ducts 39 extending through the piston 6 in the axial direction radially outside the shock rod 16, such ducts opening axially at one end into the high pressure space 14 and at the other into the low pressure space 15. The ports 45 of the piston or shock rod are in this case associated with a valve member 40 of the relief valve 41, which shuts them off in the non-actuated state, the shutting force being supplied by a spring arrangement 44.

In the design in accordance with the invention the valve member 40 takes the form of an annular member arranged to move axially on the shock rod 16, while the spring arrangement 44 is in the form of a stack of spring washers placed axially after the annular member 40. In this respect it is an advantage if the valve member 40 is in the form of a spring disk or washer as well.

On the side remote from the piston the spring arrangement 44 bears on a shoulder on the shock rod 16. Preferably the spring arrangement 44 simultaneously performs an abutment function so that it establishes the initial position of the setting piston 6 by engaging the abutment 30.

It will be clear that the ports 45 are located on a circle axially aligned with the valve member 40. It will furthermore be perceived that the relief valve 41 is best arranged so that it is moved with the piston 6 and is at least partly integrated in the same, this tending to render the shock absorber more compact.

The second damping device 38, which operates in a manner dependent on motion of the load to be slowed down, has an outlet port 46 which is initially open and which communicates on the one hand with the high pressure space 14 and on the other hand with the low pressure one 15. In this case as well it is preferably arranged as part of the piston and extends through it in the axial direction. In the present example of the invention its longitudinal axis coincides with the longitudinal axis of the shock rod 16 and extends from the bottom part end into the rod 16 towards the compensatory piston 22 after passing through the spring arrangement 44 through the transverse holes 47 and then opens at the outer side of the shock rod 16 into the low pressure space 15.

The side of the outlet port 46 adjacent to the high pressure space 14 is axially opposite to a damping element 49 fixed in relation to the housing and placed in the bottom part 4. The damping element is more particularly in the form of a pin. When a damping motion 36 of the piston 6 takes place this pin is able to plunge into the outlet opening 46 so as to reduce the cross section thereof available for the flow.

The force of the spring arrangement 44 is made of such a size that the relief valve 41 opens at given adjustable critical value established because of the pressurization of the hydraulic fluid therein. Then the hydraulic fluid may be choked in its flow by the transfer ducts 39 as it is displaced into the low pressure space 15. In this case it is convenient if there are means for adjusting the closing force of the relief valve so that the critical switching pressure value responsible for the opening of the valve may be set at the start and before the system is used.

If during operation the mass 34 strikes against the shock energy take-up member with only a small amount of energy and at a low speed of impact, the piston 6 will perform a relatively slow damping stroke 36 so that the hydraulic fluid in the high pressure space 14 is able to drain with a choking effect through the outlet port 46 without the critical pressure being established in the high pressure space 14. By suitable design of the cross section of the outlet port 46 and of the closing force of the relief valve 41 it is possible to ensure such a manner of operation. If on the other hand the mass impact takes place with a high shock energy and in particular at a high impact speed, the cross section of the outlet port 46 will be too small to ensure rapid draining of the hydraulic fluid from the high pressure space 14 so that a high pressure will be built up here until the critical pressure level is reached, whereafter the relief valve 41 will open and then fluid will be able to flow through all connections available from the high pressure space 14 into the low pressure space 15.

It will be clear that in the example of the invention considered the displacement flow moves through the piston 6 and through the shock rod 16.

When during the course of the damping motion 36 the damping element 49 plunges into the outlet opening 46, the outlet cross section thereof available for the hydraulic fluid will be altered so that an increase of the intensity of damping will be noted. In the working example of the invention there is the additional feature that the effective outlet cross section changes as a function of the damping stroke performed by the piston 6 to follow a desired damping characteristic. As a result it is possible to gently retard a mass 34 to be braked and to cause it to halt. Therefore in the present example of the invention the part of the outlet port 46 adjacent to the opening 48 is provided with a cross section becoming smaller towards the low pressure space 15.

Preferably the design is such that the damping element 49 only plunges into the opening 48 when the piston 6 has already moved some distance along its damping stroke 36 starting from the abutment.

The separate individual effects of the damping devices 37 and 38 described above may be caused to supplement each other. Thus when the first damping device 37 is in action, the second damping device 38 will generally be in operation to modulate the operation of the first device so that two-step operation results, the second operational step commencing with the plunging of the damping element 49 into the outlet port 46. It is also an advantage if after the absorption of the greater part of the shock energy via the damping device 37 its relief valve 41 is able to close during the course of the damping stroke 36 so that the further damping will be performed via the damping device 38 operating in a manner dependent on the travel.

In order to facilitate the return of the piston 6 after completion of damping motion 36 into its initial position as far as the abutment 30, the high pressure space 14 and the low pressure space 15 are additionally connected together via a return duct 50. This return duct is connected in parallel to the outlet port 46 and the transfer ducts 39, with the presence however of an intermediately placed check valve 51 which during the damping motion 36 prevents free through flow, while on the other hand during an oppositely directed return flow there is a flow of the hydraulic fluid from the low pressure space 15 back into the high pressure space 14, In the illustrated form of the invention the return flow duct 50 comprises the peripheral groove in the piston 6 and receiving the sealing element 10. The groove intersects the transfer ducts 39 and communicates via an intermediate space 52 on the outer periphery of the piston 6 with the low pressure space 15. The sealing element 10 is mounted in the peripheral groove so that it may be shifted in the axial direction and to the side of the intermediate space 52 there is a further sealing element 53 adjacent to it. When the piston 6 is performing its damping stroke 36, the sealing element 53 is pressed against the side of the groove and will seal off the access to the intermediate space 52. In the case of a reverse motion the sealing element 53 will come out of engagement and the hydraulic fluid will be able to flow via the intermediate space 52, the peripheral groove with the sealing element 10 and back via the transfer ducts 39 to the high pressure space 14.

By way of amplification it is to be noted that it is an advantage if the cross section to the outlet opening 46 is able to be varied in size.

In the illustrated form of the invention the return of the piston 6 is mainly caused by the compensatory piston 22, which is biased by the spring towards the low pressure space 15 and thus accelerates the return flow of the hydraulic fluid.

The main advantages of the invention may be seen in the short design, the simple and low-price structure and furthermore the fact that the shock absorber needs little servicing. Another advantage is that only a few sealing components are required, that is to say a dynamic and a static sealing ring, the sealing effect being so effective that the shock absorber does not have to be topped up with oil. When the shock absorber is assembled a certain biasing action is set without the oil having to be replaced to make good losses due to leakage from the system. Such a biasing action may be conveniently obtained by inserting the bottom part 4 of the housing to a suitable depth in the damping space 5 and then locking it in place.

I claim:

1. A hydraulic shock absorber, comprising:
a unitary, enclosed cylinder housing having first and second closed ends to define an interior damping space therebetween;
a stationary wall provided in said damping space to divide said damping space into a first pressure space and a second pressure space;
means defining an opening in said stationary wall to provide fluid communication between said first and second pressure spaces;
a piston reciprocally mounted in said first pressure space, said piston having a shock rod secured thereto and movable therewith and extending through said opening provided in said stationary wall into and through said second pressure space and out of said second pressure space through an opening in said first closed end of said cylinder housing to a terminal end remote from said piston, said piston being initially positioned in a first position adjacent said stationary wall and being supported for movement toward said second closed end of said cylinder housing;
a liquid medium filling said first and second pressure spaces;
means for pressurizing said liquid medium to a finite pressure;
a first damping device comprising a pressure responsive, normally closed first fluid circuit connected in fluid circuit between said first and second pressure spaces and bypassing said piston, said first fluid circuit, when opened, being of a sufficient size to restrict the volume of fluid flow therethrough, and an opening means for effecting an opening of said first fluid circuit in response to a finite increase in the pressure on said liquid medium in said first pressure space to allow said liquid medium to flow between said first and second pressure spaces therethrough;
a second damping device comprising a path of movement responsive, normally open second fluid circuit, separate from said first fluid circuit, connected in fluid circuit between said first and second pressure spaces and bypassing said piston, said second fluid circuit being of a sufficient size to restrict the volume of fluid flow therethrough, and a closing means for effecting a gradual closing of said second fluid circuit in response to an increasing travel distance of said piston moving away from said stationary wall and toward said second closed end of said cylinder housing;
whereby a shock load applied to said shock rod will cause said shock rod and said piston connected thereto to be displaced axially of said cylinder housing, said piston being moved away from said stationary wall toward said second closed end of said cylinder housing, said fluid medium in said first pressure space first flowing in a restricted flow manner through said normally open, second fluid circuit, however, (1) if the shock load has a high shock energy and a high impact speed, said fluid medium in said first pressure space will be unable to exit said first pressure space through said normally open second fluid circuit fast enough to thereby cause the pressure on said fluid medium in said first pressure space to increase and effect an opening of said normally closed, first fluid circuit to allow a greater flow restricted volume of fluid flow from said first pressure space to said second pressure space, said second fluid circuit becoming gradually closed by said closing means as said piston approaches said second closed end to provide an even greater restriction to the flow of fluid from said first pressure space to said second pressure space to further retard the movement of said shock rod and the shock load applied thereto and (2) if the shock load has a low shock energy and a low impact speed, said fluid medium in said first pressure space will exit said first pressure space through said normally open, second fluid circuit without causing said first normally closed circuit to open, said low impact speed being absorbed by said closing means gradually closing said second fluid circuit as said piston approaches said second end wall; and wherein a pressure responsive, normally closed, third fluid circuit is provided and is connected in fluid circuit between said first and second pressure spaces and bypassing said piston, and a further opening means for effecting an opening of said third fluid circuit in response to a finite increase in the pressure on said liquid medium in said second pressure space to allow said liquid medium to flow from said second pressure space to said first pressure space through said third fluid circuit so as to effect an urging of said piston toward said stationary wall following the completion of a shock absorbing function and a removal of the shock load from said shock rod, additional liquid medium being allowed to pass through said second passageway from said second pressure space to said first pressure space as said damping element is withdrawn from said second passageway as said piston continues to move toward said stationary wall.

2. The hydraulic shock absorber according to claim 1, wherein said normally closed, first fluid circuit includes means defining a first passageway through a body portion of said piston and a normally closed, first valve mechanism blocking said first passageway, said first valve mechanism including a valve member axially displaceable away from said piston to open said passageway, and a spring located between said stationary wall and said piston for resiliently urging said valve member toward and into engagement with said piston to block and close said passageway, said spring yielding to said finite increase in pressure on said liquid medium to allow said valve member to move away from said piston and open said passageway.

3. The hydraulic shock absorber according to claim 2, wherein said spring is a cup spring arrangement.

4. The hydraulic shock absorber according to claim 2, wherein said closing means includes an elongated damping element on said second closed and extending into said first pressure space and toward said piston; and wherein said second fluid circuit includes means defining a damping element receiving second passageway through said piston, an axis of said second passageway being coaxial with an axis of said elongated damping element, whereby as said piston approaches said second closed end, an end of said damping element remote from said second closed end will enter said second passageway to begin to gradually close said second passageway.

5. The hydraulic shock absorber according to claim 4, wherein a diameter of said second passageway is tapered from a large diameter at a juncture thereof with said first pressure space to a small diameter at a juncture thereof with said second pressure space.

6. The hydraulic shock absorber according to claim 5, wherein a diameter of said damping element is uniform throughout its length, said damping element diameter being smaller than said larger diameter end of said second passageway, so that as said damping element moves further into said second passageway as said piston approaches said second close end, said second passageway will become gradually closed.

7. The hydraulic shock absorber according to claim 1, wherein said third fluid circuit is defined by a third passageway defined by a clearance space between said piston and an interior wall surface of said damping space; and wherein said further opening means includes a movable sealing element movable axially relative to said piston between a blocking position always blocking said third passageway whenever the fluid pressure in said first pressure space is at least one of equal to and greater than the fluid pressure in said second pressure space, and an opened position always allowing liquid medium transfer from said second pressure space to said first pressure space whenever the fluid pressure in said second pressure space is greater than the fluid pressure in said first pressure space.

* * * * *